March 28, 1950  A. FODOR  2,501,812

SPACE HEATER

Filed May 13, 1948

Inventor:
Ansal Fodor

Patented Mar. 28, 1950

2,501,812

UNITED STATES PATENT OFFICE 2,501,812

SPACE HEATER

Antal Fodor, New York, N. Y.; Jeanne B. Fodor, administratrix of said Antal Fodor, deceased, assignor to American Thermo-Tech Corporation, New York, N. Y.

Application May 13, 1948, Serial No. 26,777

10 Claims. (Cl. 219—38)

This invention relates to space heaters generally and in particular to a heater type which is so constructed that it will emanate heat from a single heating source in a combination of three distinct manners, to wit, by means of a fast-moving current of directly and highly heated primary air, by means of a slower-moving current of indirectly and lesser heated secondary air and by radiation, the temperature of which three types of heat emanation being individually controllable.

The afore-indicated principal structural arrangement of the heater and additional features of the device are designed to reduce heat losses to a minimum, whereby overall high heating efficiency is effected.

One of the main objects of this invention resides in the provision of a heater wherein is employed a device based on the Venturi principle, and into which device fresh primary air is caused to enter at a certain velocity, whereupon it is subjected to high heat, and, in its now heated state, is passed through the Venturi device, whereby its velocity is materially increased so that a fast-moving, highly heated body of air issues from the heater.

Another object of the present invention is to provide a space heater comprising a substantially closed outer casing containing a Venturi device, the latter being equipped with a heat source disposed therewithin, said Venturi device having intake and outlet means for directly heatable primary air, said casing also having intake and outlet means, independent from those of the Venturi device for indirectly heatable secondary air, said Venturi device being spaced from the casing so that secondary air passing between the Venturi device and the casing walls to without is heated by the walls of the Venturi device and leaves the casing at a lesser velocity than the directly heated primary air discharging from the Venturi device, the secondary air in turn causing the heating of the casing walls, which latter radiate heat from their surfaces.

Another object of the present invention is the provision of control means with the Venturi device and with the casing whereby the amount and the temperature of both primary and secondary air, as well as the temperature of the radiant heat emanating from the casing surface may be governed.

A further object of the present invention is the provision and location of primary air intakes in the Venturi device whereby the bottom structure of the latter may be effectively cooled by the incoming fresh air passing into the device.

Another object of this invention is the provision of control means at the air outlet of the Venturi device, whereby not only the amount of discharging air but also its direction of flow may be governed.

A still further object of this invention resides in the proportioning of the intake and outlet orifices of the device in that the air intakes are larger in areas than the air outlets.

The foregoing and still further objects and important advantages of the present invention will become more fully disclosed in the ensuing description of the device, reference being had to the accompanying drawings, wherein.

Figure 1:
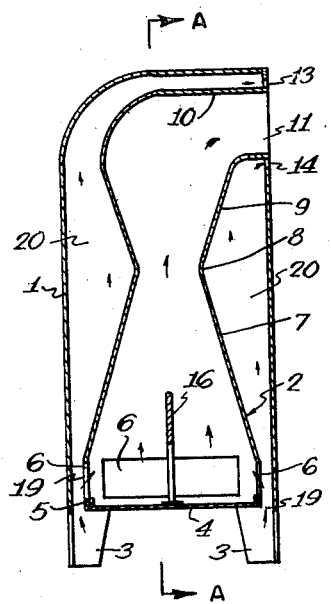
Fig. 1 is a vertical cross section through a typical space heater in accordance with the present invention.

In the figures, numeral 1 denotes the outer heater casing in which is suspended a Venturi device or chamber 2, spaced from all walls of the casing. The casing comprises a substantially fully closed structure which rests on spacer legs 3, the lower end of the casing being open so that air may enter therethrough. Venturi chamber 2 is provided with a solid bottom 4 from the periphery of which extends upwardly a substantially rectangular structure 5, which is provided at both ends and both sides with air intake apertures 6. Continuing upwards from structure 5 is an inwardly tapering lower Venturi portion 7 which gradually diminishes in cross section to form a restricted junction area 8, from which extends an upper chamber portion 9, widening in cross section in upward direction and terminating in a short duct 10, projecting with its open end 11 into an opening 12 provided in the upper part of casing 1.

Adjacent to opening 12 there are provided longitudinal openings 13 and 14 disposed, respectively, above and beneath duct end 11 and are somewhat longer than opening 12. Within that opening is placed an adjustable louver structure 15.

Centrally held within lower portion 7 of the Venturi chamber and disposed above air intake openings 6 and below restricted Venturi portion 8 is a heat source in the form of an electric heating element 16. It will be noted that the combined bottom openings 6 provided in the rectangular structure of the lower Venturi chamber portion are of a larger area than outlet 11 at the end of duct 10. In other words, the air outlet of the Venturi chamber is made substantially smaller than the air intake for reasons hereinafter explained.

*Modification*

Figure 2:
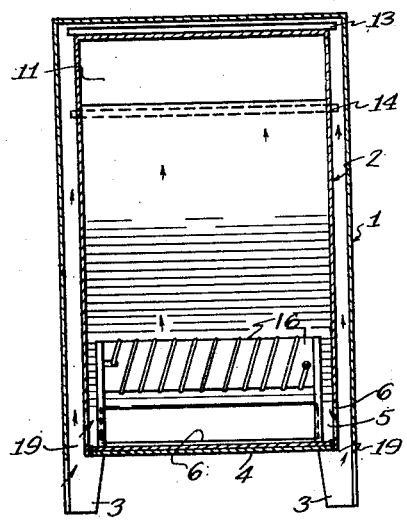
Fig. 2 is a section therethrough taken along lines A—A of Fig. 1.
Figure 3:
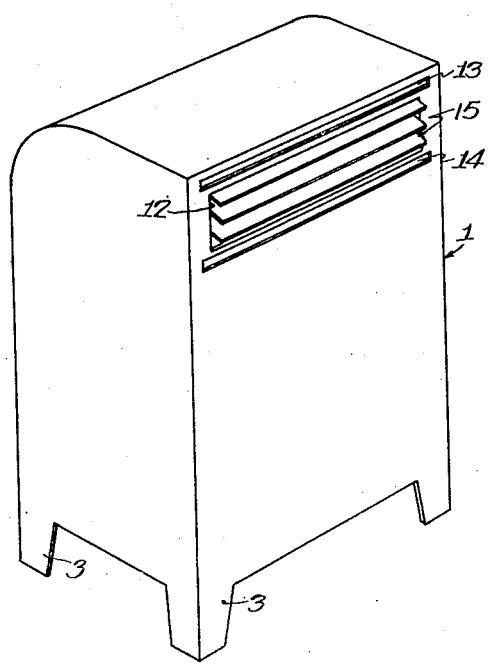
Fig. 3 is a perspective view of the heater.
Figure 4:
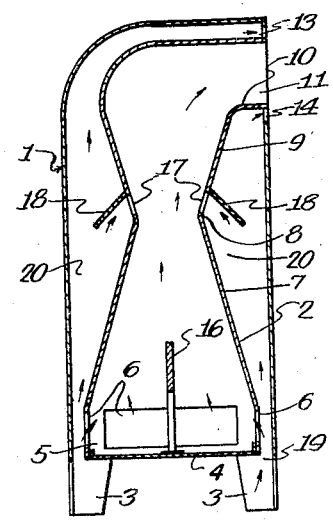
Fig. 4 is a vertical cross section of a modified form of the heater construction.

In Fig. 4 a modified form of the device is illustrated, which is substantially identical with the device described in connection with Figs. 1, 2 and 3, with the exception that above restricted juncture area 8 at which lower portion 7 and upper portion 9 of the Venturi chamber are connected, there are provided auxiliary air intake openings 17, equipped with deflecting louvers or baffle plates 18, which latter are adapted to direct air into openings 17 and thus into the upper part 9 of the Venturi chamber.

*Operation*

The device illustrated in Fig. 1 is so arranged that when heating element 16 is energized, a primary body of air is drawn into the Venturi chamber through peripheral openings 6, and as it contacts and passes over element 16, its temperature is rapidly raised to a relatively high degree, whereby its volume becomes materially increased and its density decreased. As the thus heated lighter air rises and passes through restricted portion 8, it gains in velocity to such an extent that it issues from duct end 11 at a relatively high speed.

The greater the velocity of heated air leaving the heater, the more vigorous will be the circulation of air within the space to be heated, and the more rapid a heat exchange will take place.

In order to obtain the best efficiency from the device on that score, the air outlet for the heated air is made substantially smaller in area than that of the combined air intake areas 6, and as the result, the velocity of heated air leaving the heater reaches its maximum.

The heated primary air raises the temperature of the Venturi chamber walls, which in turn heat the body of air between the chamber and the casing walls. Obviously, the temperature of that air, termed secondary air, is lower than that of the primary air passing through the Venturi chamber. As the temperature of the secondary air rises, an upward air movement is caused so that fresh air is drawn through the relatively large spaces 19, and heated air is discharged through the much smaller area of openings 13 and 14, adjacent to louvered opening 12. Having passed through spaces 19 and becoming heated, the upward moving secondary air expands when it reaches the substantially larger spaces 20, between the bodily reduced chamber portions and the casing walls, whereby its velocity becomes somewhat reduced, but is again increased when the air leaves discharge openings 13 and 14. The speed of the secondary air is of course less than that of the primary air. The heated secondary air heats in its upward progress the walls of the casing, which latter, in turn, radiate heat to the surrounding room area.

As outlined above, the device provides three types of heat emanation, first, a rapidly moving, highly heated current of primary air issuing from Venturi chamber 2 through duct end 11, a second supply of lesser heated air and of a lesser velocity issuing from the casing through openings 13 and 14, and thirdly, radiating heat emanating from the walls of the casing heated by the secondary air. All three supplies of heat may be readily controlled by governing the amount of air entering both the Venturi chamber as well as the casing, whereby also the temperature of the radiating heat emanating from the casing walls may be readily governed. Such control of the supply of air may be effected by suitable shutters or valves, not illustrated in the drawings for simplicity sake, since the arrangement of such controls is quite obvious.

It is to be noted that, while the secondary air heats the casing walls, it also serves as a moving protective layer between the highly heated Venturi chamber and the casing body, thereby preventing excessive or overheating of the latter.

The modified form of the device shown in Fig. 4 is provided with control means for supplying relatively cool auxiliary air to upper body portion 9 of the Venturi chamber through openings 17, equipped with baffle plates 18, which latter are designed to direct such auxiliary air supply into the chamber. Depending upon the position of baffle plates 18 in respect to openings 17, the quantity of air and its direction relative to that of the heated primary air current passing through the Venturi chamber may be positively controlled, whereby the temperature of the issuing primary air becomes effectively regulated.

Louvers 15 in opening 12 control the quantity as well as the direction of heated air leaving the Venturi chamber, thus providing means for regulating the rate and direction of heating space.

*Conclusion*

From the above description of the two forms of the device, as well as from the mode of its operation, it becomes clearly evident that substantially all heat created by heating element 16 becomes fully utilized, whereby negligible heat losses and high heat efficiency of the device are assured.

While in the foregoing specific constructions of the space heater are dealt with, it is quite obvious that when its outlined work principle is employed for either smaller or larger devices of this type, structural changes may be required, such changes being deemed to lie within the scope of this invention as set forth in the annexed claims.

I claim:

1. In a space heater, an outer casing, a Venturi chamber within and spaced from all walls of the casing and having air-intake and air-outlet means at its lower and upper ends, respectively, and a heat source within the lower end of the chamber.

2. In a space heater as per claim 1, said Venturi chamber having a restricted body portion above said heat source.

3. In a space heater as per claim 1, said Venturi chamber having a fully closed bottom and a restricted body portion above said heat source, said air-inlet means being arranged peripherally and close to the bottom.

4. In a space heater, an outer, substantially fully closed casing open at its lower end, a Venturi chamber suspended within but being spaced from all walls of the casing and comprising lower and upper portions tapering toward each other and forming at their juncture a restricted body portion, the lower chamber portion having a closed bottom and peripherally arranged air-intake apertures adjacent to said bottom, the top of the upper chamber portion forming a duct, the open end of which terminating at and registering with an opening provided near the top end of one of the casing walls, and a heat source within the lower chamber portion; said air-intake apertures of the latter portions being so disposed that fresh, relatively cold, primary air entering through them keeps the chamber bottom cool and is directed against the heat source whereby its temperature is materially raised before reaching and passing said restricted body portion, the velocity of the thus heated air being substantially increased as it passes that restricted body portion on its way to without through the open duct end.

5. In a space heater as per claim 4, said casing having air-outlets for discharging secondary air entering at its lower open end and which air is being heated by contact with said Venturi chamber.

6. In a space heater, a substantially closed outer casing open at its lower end, a Venturi chamber within but being spaced from all walls of the casing, said chamber comprising lower and upper portions tapering toward each other and forming at their juncture a restricted body portion; the lower chamber portion having a closed bottom and peripherally arranged air-intake apertures adjacent to said bottom; the upper chamber portion having air-outlet means at its top end; a heat source within the lower chamber portion spaced from the latter's closed bottom and disposed above said air-intake apertures.

7. In a space heater as per claim 6, said upper chamber portion having air-intake means to facilitate entry of auxiliary air into the chamber for controlling the temperature of the air leaving the chamber through the air-outlet means of the upper chamber portion.

8. In a space heater as per claim 6, the air-intake aperture of the lower chamber portion being substantially larger than the air-outlet means of the upper chamber portion.

9. In a space heater as per claim 6, said air-outlet means of the upper chamber portion having adjustable regulating means for controlling the volume and direction of heated air issuing from said air-outlet means.

10. In a space heater as per claim 6, said casing having air-outlet means for discharging air which enters its lower open end and which passes in the form of a moving protective layer between the outer heated surface of said chamber and the inner surface of the casing.

ANTAL FODOR.

REFERENCES CITED

The following references are of record in the file of this patent:

UNITED STATES PATENTS

| Number | Name | Date |
|---|---|---|
| 1,749,039 | Lincecum | Mar. 4, 1930 |
| 1,937,669 | Replogle | Dec. 5, 1933 |
| 2,188,122 | Steingruber | Jan. 23, 1940 |
| 2,313,786 | Van Daam | Mar. 16, 1943 |
| 2,425,702 | Marr | Aug. 12, 1947 |

FOREIGN PATENTS

| Number | Country | Date |
|---|---|---|
| 646,494 | Germany | June 15, 1937 |